United States Patent
Fielding et al.

(10) Patent No.: US 7,447,432 B2
(45) Date of Patent: Nov. 4, 2008

(54) REGULATING RADIATION COMPONENT POWER IN WAVELENGTH DIVISION MULTIPLEXED OPTICAL COMMUNICATION SYSTEMS

(75) Inventors: John Richard Fielding, Cambs (GB); Graham Ronald French, Burwell (GB)

(73) Assignee: Ericsson AB, Stockholm (SE)

( * ) Notice: Subject to any disclaimer, the term of this patent is extended or adjusted under 35 U.S.C. 154(b) by 604 days.

(21) Appl. No.: 10/468,163

(22) PCT Filed: Feb. 12, 2002

(86) PCT No.: PCT/GB02/00612

§ 371 (c)(1),
(2), (4) Date: Jan. 23, 2004

(87) PCT Pub. No.: WO02/067480

PCT Pub. Date: Aug. 29, 2002

(65) Prior Publication Data

US 2004/0114927 A1 Jun. 17, 2004

(30) Foreign Application Priority Data

Feb. 17, 2001 (GB) ................................ 0103980.9

(51) Int. Cl.
*H04B 10/08* (2006.01)

(52) U.S. Cl. ............................. 398/38; 398/58; 398/59; 398/25; 398/30; 398/31; 398/33; 398/34; 398/177; 398/181; 398/94; 398/197; 398/83; 398/79; 385/24; 385/37; 359/337; 359/341.1; 370/224

(58) Field of Classification Search ............ 359/337.12, 359/341, 337; 370/224; 398/58, 38, 94, 398/197, 59, 79, 83, 30, 25, 31, 33, 34, 177, 398/181; 385/24, 37

See application file for complete search history.

(56) References Cited

U.S. PATENT DOCUMENTS

| | | | |
|---|---|---|---|
| 6,304,347 B1 * | 10/2001 | Beine et al. ................... | 398/38 |
| 6,643,055 B1 * | 11/2003 | Askinger et al. ....... | 359/337.12 |
| 6,728,207 B1 * | 4/2004 | Askinger et al. ............ | 370/224 |
| 6,922,532 B2 * | 7/2005 | Simard et al. ................ | 398/177 |

FOREIGN PATENT DOCUMENTS

EP  0 869 694 A2  10/1998

(Continued)

OTHER PUBLICATIONS

*Power Management System Design of an Optical Multiwavelength Transport Network*, J. Zhou, et al., IEE prod. Optoelectron, vol. 143, No. 3, Jun. 1996, pp. 177188.

Primary Examiner—Hanh Phan
(74) *Attorney, Agent, or Firm*—Kirschstein, et al.

(57) ABSTRACT

There is provided a method of, and apparatus for, regulating radiation component (wavelength channel) power in a wavelength division multiplexed (WDM) optical communications system (10). The system (10) comprises a plurality of nodes (20) interconnected through optical waveguides (30, 40) (optical fibers). The method is characterised by: passing one or more tokens (300) around the system from node to node; adjusting nodal settings (150, 170), such as optical attenuation, applied at each node to regulate the power of WDM radiation components at the node in response to receiving one or more tokens; and repeating the method until WDM radiation component power within the system is substantially regulated.

11 Claims, 3 Drawing Sheets

FOREIGN PATENT DOCUMENTS

| | | |
|---|---|---|
| EP | 0 936 760 A2 | 8/1999 |
| EP | 0 936 769 A2 | 8/1999 |
| WO | WO 99/21302 | 4/1999 |
| WO | WO 00/08791 | 2/2000 |
| WO | WO 01/18999 A1 | 3/2001 |

* cited by examiner

REGULATING RADIATION COMPONENT POWER IN WAVELENGTH DIVISION MULTIPLEXED OPTICAL COMMUNICATION SYSTEMS

The present invention relates to a method of regulating radiation component power in wavelength division multiplexed (WDM) optical communication systems. Moreover, the invention also relates to an optical communication system employing the method of the invention.

Optical radiation in the context of the present invention is defined as electromagnetic radiation having a free-space wavelength in a range of 500 nm to 3000 nm, although a free-space radiation wavelength of substantially 1530 nm to 1570 nm is a preferred part of this range.

Smaller conventional optical communication systems, frequently referred to as "metro or metropolitan systems", comprise a plurality of passive nodes interconnected through optical fibre waveguides. Passive nodes are defined as those being devoid of optical amplification. The nodes are often interconnected in ring configurations having a diameter of 10 km or less.

Communication traffic is communicated between the nodes by conveying WDM modulated radiation components, often termed wavelength channels, through the waveguides. The nodes comprise associated add-drop multiplexers which are configured to do one or more of:

(a) drop one or more specific wavelength channel/s at the node; and
(b) add one or more specific wavelength channel/s at the node.

Typically, the add-drop multiplexers employ photo-induced Bragg fibre grating filters or dielectric filters to achieve such selective dropping and adding of the radiation components (wavelength channels). To reduce cost, the filters are generally not retunable which results in the systems being of fixed configuration in term of wavelength channel interconnections between nodes. To re-configure such systems, require the filters to be physically removed and alternative filters installed.

In the smaller "metro systems", radiation components are added to one or more of the nodes at a sufficient power level to ensure that an adequate signal-to-noise ratio is achieved at one or more nodes where the components are received and detected. The power level is limited by safety considerations relating to fibre waveguide breaks, and WDM interchannel cross-talk which is governed by the selectivity of the optical filters employed at the nodes.

When the system incorporates more nodes and/or increases in diameter, for example to 100 km diameter or more, attenuation within the waveguides and at the add-drop multiplexers at the nodes results in degraded signal-to-noise ratios at the nodes receiving and detecting radiation components. In order to address such increased attenuation, it is established practice to include one or more erbium-doped fibre optical amplifiers (EDFAs) to increase radiation power within the waveguides and thereby improve signal-to-noise ratio; for example, a 180 km diameter WDM communication system might typically include thirteen EDFAs. However, EDFAs are relatively expensive and optically non-linear devices. For example, if excessive radiation power is input into an EDFA, it can exhibit spontaneous oscillation and lase. Moreover, in an EDFA pumped at constant power, if several WDM radiation components are input simultaneously and one of the components is of a significantly greater power relative to other of the components, the EDFA will tend to accentuate the component of significantly greater power.

Thus, in optical communication systems comprising one or more EDFAs, there arises a problem of ensuring that WDM radiation components are relatively matched in power, namely substantially optically levelled, when input to the one or more EDFAs. In larger high-performance re-configurable optical communication systems, for example in long-haul optical communication systems including fibre waveguide paths of length 100 km or more between nodes, levelling is often performed at each system node and requires the provision of complex high-performance optical hardware.

The inventors have appreciated that in smaller optical communication systems including one or more EDFAs, it is not economically viable to perform levelling in a manner as implemented in the aforementioned larger re-configurable systems. Moreover, the inventors have also appreciated that in optical systems including more than one EDFA, that WDM radiation component levelling is a multi-variable high-order problem, such levelling being potentially susceptible to oscillatory behaviour. In an attempt to overcome, at least in part, the aforementioned problem, the inventors have devised a method of regulating the power of radiation components within a WDM system involving the use of one or more tokens circulated within the systems. A token is defined as a grouping of data which can be passed around an associated communication system for regulating its operating parameters. Such one or more tokens are capable of circumventing oscillatory problems and reducing the task of levelling control to a substantially first-order iterative process.

According to a first aspect of the present invention, there is provided a method of regulating radiation component power in a wavelength division multiplexed (WDM) optical communications system, the system comprising a plurality of nodes interconnected through waveguides, the method characterised by: passing one or more tokens around the system from node to node; adjusting nodal settings applied at each node to regulate the power of WDM radiation components at the node in response to receiving one or more tokens; and repeating the method until WDM radiation component power within the system is substantially regulated.

The method of the invention provides the advantage that system regulation can be implemented in a relatively simple cost-effective manner and is also capable of reducing oscillatory behaviour when performing WDM radiation component power levelling.

The inventors have appreciated that it is beneficial for each node to be provided with information regarding settings of other nodes so that the node can regulate its own settings to suit. Advantageously, the method further comprises at each node measuring WDM radiation component powers of radiation received thereat and recording the powers in the one or more tokens for subsequent communication to one or more other nodes of the system.

When performing regulation at the nodes, the inventors have appreciated that attenuation is a key parameter. Thus, the method further comprises for each node in possession of one or more of the tokens, adjusting attenuating means incorporated in the node for at least partially levelling WDM radiation component powers within the system.

The inventors have appreciated that certain system configurations are especially preferred for passing one or more tokens. In particular, the nodes are advantageously connected in a ring configuration (i.e. connected in a serial manner to form a closed loop) and comprising conveying one or more of the tokens around the ring.

In certain communications systems, it is preferable to employ a simple token arrangement as this is easier to manage. Thus, one or more of the tokens are preferably passed alternately in clockwise and counter-clockwise directions around the ring. By such contra-propagation, a single token can be used to regulate radiation components propagating in both clockwise and counter-clockwise paths of the ring.

In order to expedite regulation as quickly as possible after initial energization of the system, it is preferable to propagate at least one token in a clockwise direction around the ring concurrently with propagating at least one token in a counter-clockwise direction around the ring for regulating clockwise and counter-clockwise communication traffic paths.

Preferably, the tokens are conveyed together with general communication traffic. Alternatively, where the system is provided with a supervisory WDM channel the one or more tokens are advantageously conveyed around the system in the supervisory channel.

The inventors have further appreciated that a degree of hierarchy is required for enabling the system to cope with initial energization conditions. Thus, beneficially, one of the nodes is designated to be a master node for initiating communication of one or more of the tokens around the system after initial system energization.

Interpretation of the tokens can be a relatively complex process. In order to cope with such complexity, it is preferable that each node includes operating software for interpreting one or more of the tokens and adjusting at least one of attenuation and tuning within the node for regulating radiation component power at the node. It is advantageous for the software to be capable of recording its nodal settings, hence each node in possession of one or more of the tokens is preferably operable to record in the one or more tokens nodal settings corresponding to the node.

According to a second aspect of the invention, there is provided a wavelength division multiplexed (WDM) communication system operable according to the method of the first aspect of the invention.

In order that the invention can be better understood, embodiments of the invention will now be described, by way of example only, with reference to the accompanying drawings in which.

Figure 1:
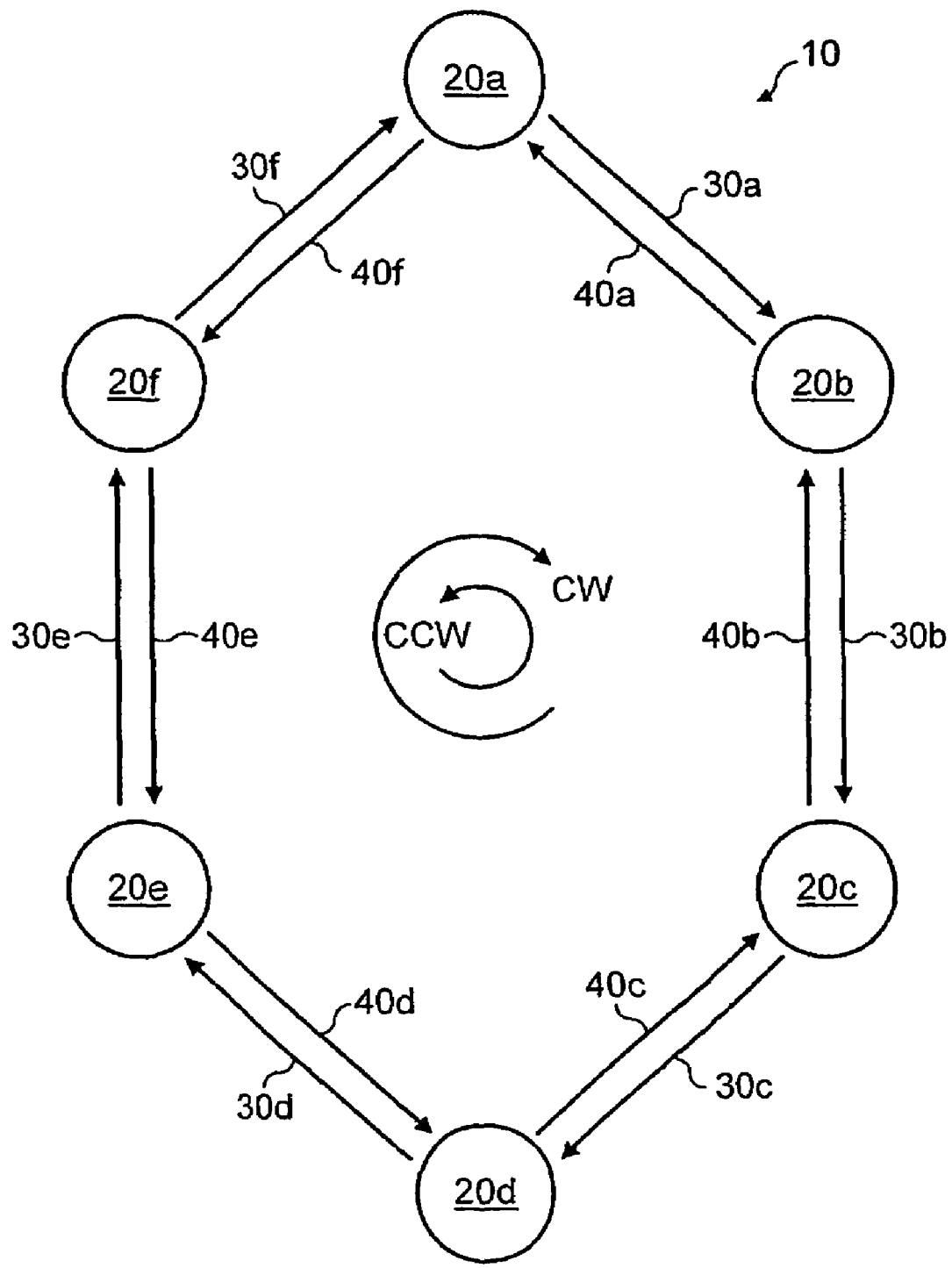
FIG. 1 is a schematic representation of an optical communication system employing a method in accordance with the invention for regulating WDM radiation component power.

Referring to FIG. 1, there is shown a WDM optical communication system employing a method according to the invention, the system being indicated generally by 10. In the example illustrated, the system 10 comprises six nodes 20*a*, 20*b*, 20*c*, 20*d*, 20*e*, 20*f* serially connected in a ring configuration by optical fibre waveguides 30*a*-30*f*, 40*a*-40*f*. It will be appreciated that the system 10 is an example of one configuration of communication system in which the invention can be implemented. The system 10 can be modified to include fewer or more nodes depending upon client requirements.

The waveguide interconnection within the system 10 will next be described.

The fibre waveguides 30*a*, 30*b*, 30*c*, 30*d*, 30*e*, 30*f* are coupled from the nodes 20*a*, 20*b*, 20*c*, 20*d*, 20*e*, 20*f* to the nodes 20*b*, 20*c*, 20*d*, 20*e*, 20*f*, 20*a* respectively to convey radiation components in a clockwise (CW) direction around the system 10. Likewise, the fibre waveguides 40*a*, 40*b*, 40*c*, 40*d*, 40*e*, 40*f* are coupled from the nodes 20*b*, 20*c*, 20*d*, 20*e*, 20*f*, 20*a* to the nodes 20*a*, 20*b*, 20*c*, 20*d*, 20*e*, 20*f* respectively to convey radiation components in a counter clockwise (CCW) direction around the system 10.

General operation of the system 10 will now be described in overview.

Communication traffic to be conveyed between the nodes 20 is modulated onto optical radiation having a free-space wavelength in the order of 1550 mm, the radiation being partitioned into 32 wavelength division multiplexed (WDM) radiation components or bands. The bands are also known as channels. Moreover, the channels are spaced apart in wavelength by 0.8 nm which corresponds to substantially a 100 GHz frequency spacing. Each channel is capable of conveying information asynchronously and independently of the other channels. Thus, the waveguides 30, 40 are each capable of simultaneously conveying the 32 channels in CW, CCW directions respectively in the system 10. It will also be appreciated that not all the channels are necessarily populated with modulated radiation components; channel population will depend upon how the system 10 is configured for its clients.

Next, the nodes 20 will be elucidated in more detail.

Figure 2:
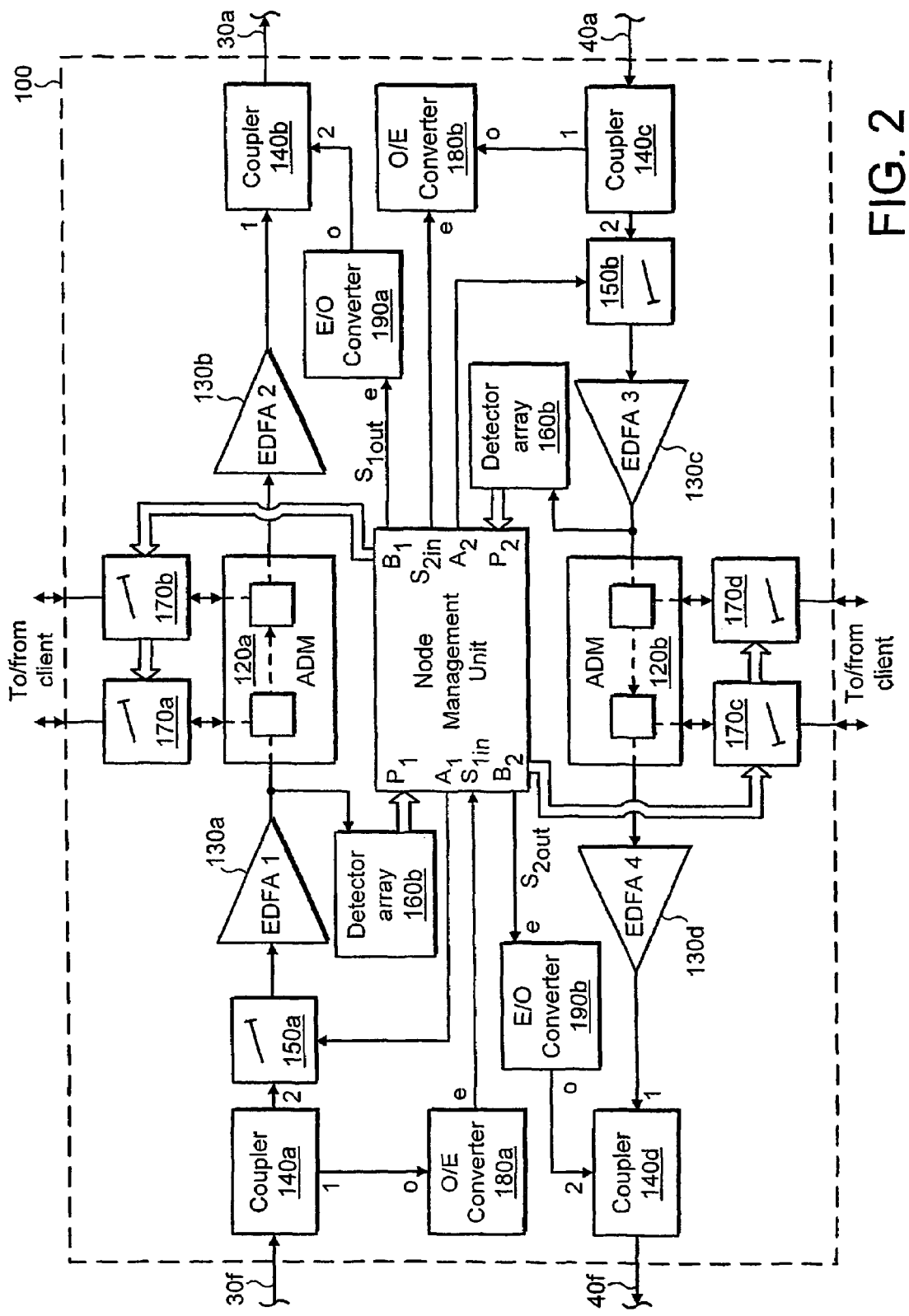
FIG. 2 is a block diagram of a node of the system shown in FIG. 1.

The nodes 20 are substantially mutually similar in configuration. In FIG. 2, the node 20*a* is shown included within a broken line 100. The node 20*a* comprises a node management unit 110, and first and second optical add-drop multiplexers (ADMs) 120*a*, 120*b* respectively. The node 20*a* further includes first, second, third and fourth erbium-doped fibre amplifiers (EDFA) 130*a*, 130*b*, 130*c*, 130*d* respectively. Moreover, the node 20*a* also comprises first, second, third and fourth optical couplers 140*a*, 140*b*, 140*c*, 140*d* respectively. Furthermore, the node 20*a* incorporates first and second input optical attenuators 150*a*, 150*b* respectively and also first and second photodetector arrays 160*a*, 160*b* respectively. The first ADM 120*a* has associated therewith first and second optical attenuators 170*a*, 170*b* respectively, and the second ADM 120*b* has associated therewith third and fourth optical attenuators 170*c*, 170*d*. Lastly, the node comprises optical-to-electrical (O/E) converters 180*a*, 180*b* and electrical-to-optical (E/O) converters 190*a*, 190*b*.

Interconnection of the constitute components within the node 20*a* will now be described with reference to FIG. 2.

The fibre waveguide 30*f* is coupled to an optical input port of the first coupler 140*a*. A first optical output port of the coupler 140*a* is coupled via the O/E converter 180*a* to an electrical input $S_{1in}$ of the management unit 110; a second optical output port of the coupler 140*a* is coupled to an optical input port of the attenuator 150*a* An optical output port of the attenuator 150*a* is connected via the first EDFA1 130*a* to an optical input port of the ADM 120*a* and also to an optical input port of the detector array 160*a*. The detector 160*a* includes optical diffraction components, for example one or more Bragg gratings, for spatially dispersing radiation components (channels) and detecting at photodiodes their individual power intensities for providing corresponding electrical output signals, digital representations, indicative of the power intensity of each associated WDM radiation component (WDM channel). The detector array 160*a* is connected to an electrical input port $P_1$ of the management unit 110 for conveying power intensity data to the management unit 110. The management unit 110 comprises an electrical output $A_1$ which is coupled to a control input of the input optical attenuator 150*a* for controlling optical attenuation therethrough.

The ADM 120*a* includes two dielectric add-drop filters (not shown in FIG. 2) which are each tuned to the wavelength band of an associated radiation component (channel). The filters are coupled in series and their input/output ports are presented at first and second optical ports of the ADM 120*a*. The first and second optical ports are coupled via the optical attenuators 170a, 170b respectively to clients (not shown), such connections often being termed tributary ports. An electrical control output $B_1$ of the management unit 110 is connected to control inputs of the first and second optical attenuators 170a, 170b for controlling optical attenuation through these attenuators. An optical output port of the ADM 120a is coupled via the second EDFA2 130b to a first optical input port of the second optical coupler 140b. Likewise, a supervisory output $S_{1out}$ is connected via the E/O converter 190a to a second optical input port of the second optical coupler 140b. An optical output port of the second optical coupler 140b is coupled to the fibre waveguide 30a.

In a similar manner to above, the fibre waveguide 40a is coupled to an optical input port of the third optical coupler 140c. A first optical output port of the optical coupler 140c is coupled via the O/E converter 180b to an electrical input $S_{2in}$ of the management unit 110; a second optical output port of the optical coupler 140c is coupled to an optical input port of the optical attenuator 150b. An optical output port of the optical attenuator 150b is connected via the third EDFA3 130c to an optical input port of the ADM 120b and also to an input port of the detector array 160b. The detector array 160b includes optical diffraction components, for example one or more Bragg gratings, for spatially dispersing radiation components and detecting at photodiodes their individual power intensities for providing corresponding electrical output signals indicative of the power intensity of each associated WDM radiation component. The detector array 160b is connected to an electrical input port $P_2$ of the management unit 110 for conveying power intensity data to the unit 110. The unit 110 comprises an electrical output $A_2$ which is coupled to a control input of the optical attenuator 150b for controlling optical attenuation therethrough.

The ADM 120b includes two dielectric add-drop filters (not shown in FIG. 2) which are each tuned to the wavelength band of an associated radiation component. The filters are coupled in series and their input/output ports are presented at first and second optical ports of the ADM 120b. The first and second optical ports are coupled via the optical attenuators 170c, 170d respectively to clients. An electrical control output $B_2$ of the management unit 110 is connected to an electrical control inputs of the optical attenuators 170c, 170d for controlling optical attenuation through these attenuators. An optical output port of the ADM 120b is coupled via the fourth EDFA4 130d to a first optical input port of the fourth coupler 140d. Likewise, a supervisory output $S_{2out}$ is connected via the E/O converter 190b, to a second optical input port of the fourth optical coupler 140d. An optical output port of the fourth optical coupler 140d is coupled to the fibre waveguide 40f.

Operation of the node 20a within the system 10 will now be described, firstly for CW (clockwise) propagating radiation around the system 10 and then for CCW (counter clockwise) propagating radiation around the system 10. The other nodes 20b, 20c, 20d, 20e function in a similar manner.

In the system 10, a first token is passed in a CW direction along the waveguides 30. Likewise, a second token is passed in a CCW direction along the waveguides 40. Alternatively, the system 10 can be configured to use only a single token which is alternately passed in CW and CCW directions around the system 10.

The management unit 110 includes a microcontroller with associated random access memory (RAM) and read only memory (ROM) for storing node operating software and data parameters received via a supervisory channel present in optical radiation received in one or more of the fibre waveguides 30f, 40a. Each node 20 in particular includes operating software capable of receiving and interpreting a token at the node 20. The token comprises an array of data which will be described in further detail later. Moreover, each node 20 is also capable of writing data values into the token.

In operation, for CW communication in the system 10, WDM radiation components propagate along the waveguide 30f and are received at the optical coupler 140a. The radiation components correspond to one or more communication channels and also to a supervisory channel/s. The first optical coupler 140a is operable to separate the radiation component corresponding to the supervisory channel/s and divert it out to the first output port of the coupler 140a and operable to the other radiation components (communication channels) to the second output port of the coupler 140a. The supervisory channel radiation component is converted into a corresponding electrical signal by the O/E converter 180a which is passed to the $S_{1in}$ input of the management unit 110. The aforementioned CW propagating token is thereby conveyed in the supervisory channel to the management unit 110.

Radiation components other than the supervisory channel radiation component (i.e. communication channels) are output from the second port of the first coupler 140a via the first optical attenuator 150a to the first EDFA1 130a. The first EDFA1 130a optically amplifies the radiation components to provide corresponding amplified radiation which propagates to the ADM 120a and also to the detector array 160a. The array 160a spatially separates the radiation components and then measures the power intensity of each of the radiation components to generate corresponding electrical signals which are passed to the input $P_1$ of the management unit 110. Software executing in the management unit 110 then interprets the CW propagating token and also the data provided at the input $P_1$ to regulate adjustment of the optical attenuation of the optical attenuators 150a, 170a, 170b.

Radiation received at the ADM 120a propagates through the add-drop filters therein where radiation components of preferred channels are dropped for output via the optical attenuators 170a, 170b. Radiation components (wavelength channels) can also be added via these optical attenuators 170a, 170b on account of the reciprocal optical characteristics of the add-drop filters. Radiation propagating through the ADM 120a, and radiation components added, propagate to the second EDFA2 130b which amplifies radiation components and outputs corresponding amplified radiation to the first input port of the second optical coupler 140b. Supervisory channel data output from the $S_{1out}$ output of the management unit 110 passes through the associated E/O converter 190a to provide a corresponding supervisory channel radiation component which propagates to the second input port of the second optical coupler 140b. Radiation components received at the first and second input ports of the second coupler 140b are combined and output from the coupler 140b for propagating along the fibre waveguide 30a further within the system 10.

In operation, for CCW communication in the system 10, WDM radiation components propagate along the waveguide 40a and are received at the third optical coupler 140c. The radiation components correspond to one or more communication channels (wavelength channels) and also to a supervisory channel. The optical coupler 140c is operable to separate a radiation component corresponding to the supervisory channel and divert it out to the first output port of the coupler 140c and transmit other radiation components (communication channels) to the second output port of the coupler 140c. The supervisory channel radiation component propagates to the associated O/E converter 180b where it is converted into a corresponding electrical signal which is passed to the $S_{2in}$ input of the management unit 110. The aforementioned token is thereby conveyed in the supervisory channel to the management unit 110.

Radiation components other than the supervisory channel radiation component are output from the second port of the third coupler 140c via the second input optical attenuator 150b to the third EDFA3 130c. The third EDFA3 130c optically amplifies the radiation components to provide corresponding amplified radiation which propagates to the ADM 120b and also to the detector array 160b. The array 160b spatially separates the radiation components and then measures the power intensity of each of the radiation components to generate corresponding electrical signals which are passed to the input $P_2$ of the management unit 110. Software executing in the management unit 110 then interprets the CCW propagating token and also the data provided at the input $P_2$ to regulate adjustment of the optical attenuation of the optical attenuators 150b, 170c, 170d.

Radiation received at the ADM 120b propagates through the add-drop filters therein where radiation components of preferred channels are dropped for output via the optical attenuators 170c, 170d. Radiation components can also be added via these optical attenuators 170c, 170d on account of the reciprocal optical characteristics of the add-drop filters. Radiation propagating through the ADM 120b and radiation components added propagate to the fourth EDFA4 130d which amplifies radiation components and outputs corresponding amplified radiation to the first input port of the fourth coupler 140d. Supervisory channel data (including the control token) output from the $S_{2out}$ output of the management unit 110 passes through the associated E/O converter 190b to provide a corresponding supervisory channel radiation component which propagates to the second input port of the fourth optical coupler 140d. Radiation components received at the first and second input ports of the fourth optical coupler 140d are combined and output from the coupler 140d for propagating along the fibre waveguide 40f.

If necessary, one or more of the EDFAs 130 can be omitted from the node 20a for reducing cost; such omission pertains also to the other nodes 20b, 20c, 20d, 20e, 20f of the system 10. Moreover, the number of nodes 20 within the system can be varied depending upon client requirements. The EDFAs 130c can be configured when initially setting up the system 10 to provide either 16 dB gain or 24 dB gain. When the system 10 is configured to have a diameter of 180 km and convey up to 32 active wavelength channels, it is beneficial that the system 10 so configured comprises in a range of ten to fifteen EDFAs, preferably thirteen EDFAs in total. Information relating to the number of EDFAs in the system 10 and their optical gains is conveyed in the token propagating within the system 10.

Figure 3:
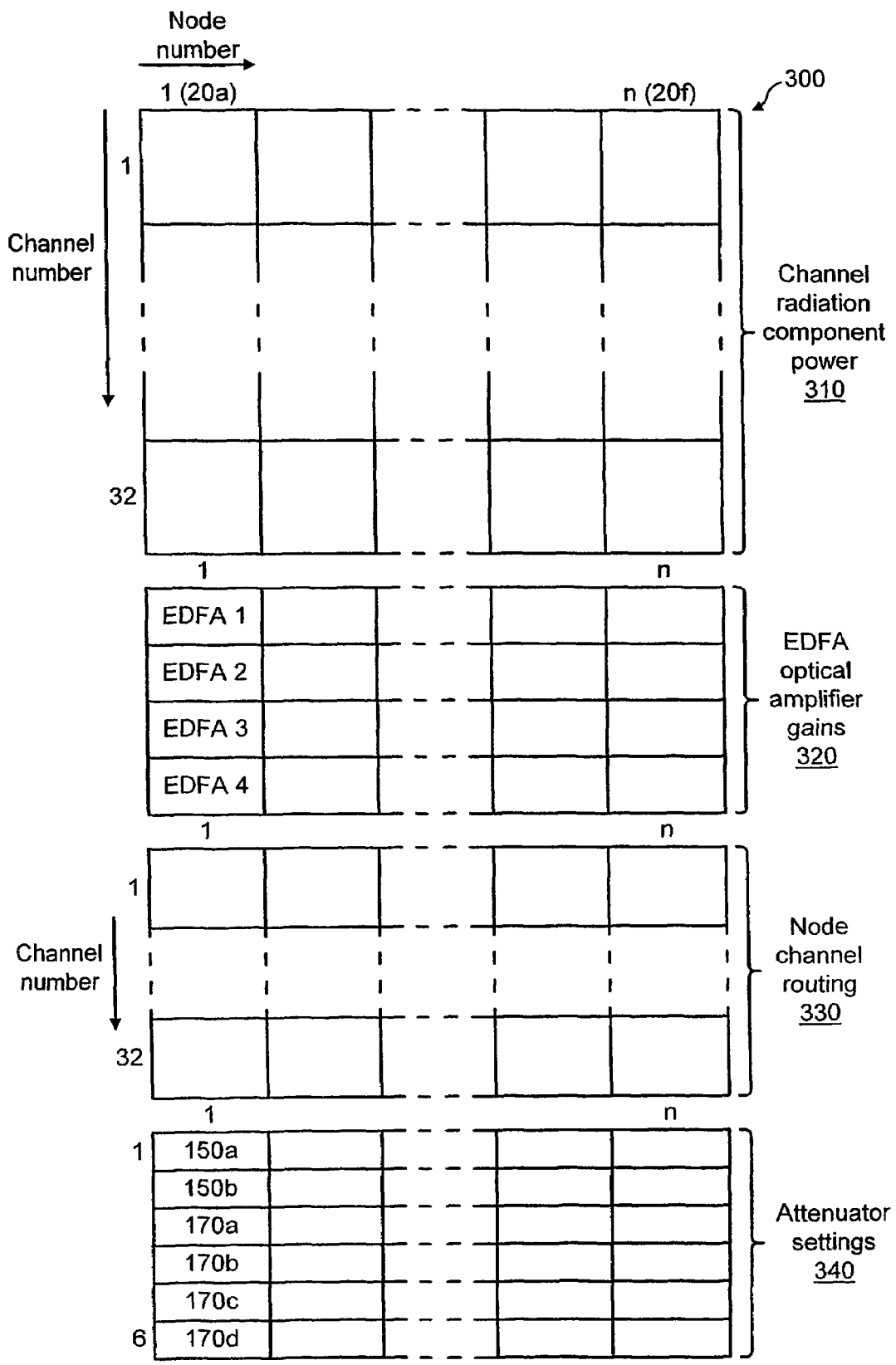
FIG. 3 is a representation of a data structure of a token for passing between nodes of the system illustrated in FIG. 1 for use in regulating WDM radiation component power.

A structure for each of the CW, CCW tokens will now be described with reference to FIG. 3.

Each of the tokens can be implemented in a number of different ways. One example of the token is illustrated in FIG. 3 and indicated generally by 300. The token 300 comprises four data arrays: a channel power array 310; an optical amplifier gain array 320; a channel interconnectivity array 330; and an optical attenuator settings array 340.

In the channel power array 310, an entry is made for each node 20 for each WDM channel, there being allowance for data entry for n nodes in the token, relating to power measurement performed by the detector arrays 160a, 160b at each node 20.

In the optical amplifier gain array 320, the optical gains of each of the EDPAs 130 in each of the n nodes 20 is recorded. Where EDFAs are not included within the nodes 20, an entry is made in the array 320 that no gain (0 dB) occurs. As elucidated in the foregoing, optical gains of the EDFAs 130 can be preferably set to either 16 dB or 24 dB, although other gain settings are possible.

In the channel interconnectivity array 330, data entry is made regarding routing of channels through the system, in other words the channel settings of dielectric filters included within the ADMs 120 in the nodes 20. The wavelength channels each define an interconnection between nodes.

Lastly, in the optical attenuator settings array 340, the attenuator 150, 170 settings (optical attenuation) employed at each of the nodes 20 is recorded.

Apart from the amplifier gain array 320 and the channel interconnectivity array 340 whose data values are fixed, the channel power 310 and the optical attenuator settings 340 are updated as the token 300 is passed around the system 10. Each node 20 is only allowed to update locations within the arrays 310, 340 relating to the respective node; in other words node 20a updates values in the token relating to node 20a, and so on.

As mentioned in the foregoing, the token 300 can be configured to convey parameters for both CW and CCW communication directions. Otherwise, the system 10 can employ two tokens, one passed CW around the system 10 and the other passed CCW around the system, the tokens being substantially independent. One of the nodes 20, for example the first node 20a, is designated as a principal node for initiating the token 300 propagation each time the system 10 is initially energized.

Operating software residing in the management unit 110 of each node 20 is arranged to receive the token 300, to interpret the data in the arrays 310, 320, 330, 340 and calculate appropriate settings for the optical attenuators 150, 170. The operating software is configured to obtain a nominally levelled power for each channel at a mid-point in each connection route employing the channel; for example channel five conveying communication traffic from node 20a to node 20c via node 20b would be of nominally levelled power at node 20b, be of somewhat higher relative power at node 20a and somewhat lower relative poser at node 20c, there being attenuation in the order of 0.4 dB through each add-drop filter included within the nodes 20a, 20b, 20c through which the communication traffic bearing radiation component propagates; attenuation also arises within the optical couplers 140 for example. As a consequence of the system 10 having a limited degree of adjustment (optical attenuation), it is not possible to level each channel exactly at each node 20. Moreover, the operating software also takes into account that a sufficiently high radiation power for each radiation component is required in the system 10 for providing a target signal-to-noise ratio and hence a corresponding upper limit for bit error rate (BER) within the system 10.

Thus, at each node 20, when the token 300 is received, the operating software in the node 20 calculates from the token 300 how it needs to set its optical attenuators 150, 170 to substantially level each channel; for example levelling can correspond to adjustment to within a range of +/−30% from nominal power. Moreover, the operating software also calculates from the token 300 settings for the optical attenuators 150, 170 to ensure that radiation components within the system 10 are of sufficient power to provide a target signal-to-noise, and hence BER performance; for example, to adjust the optical attenuators 150, 170 to ensure that radiation component power levels within the system 10 are at least 6 dB greater than minimum power levels needed to guarantee a given BER. The operating software addresses the calculation by solving a series of simultaneous equations using known matrix inversion techniques. When each node 20 has adjusted its optical attenuators 150, 170, the node 20 records its optical attenuator settings in the token 300 and then passes the token to its neighbouring node. Each of the nodes is not permitted to adjust its optical attenuators 150, 170 unless it is in possession of the token 300. Moreover, each node 20 is allowed to possess the token 300 for a sufficient period to allow its optical attenuators 150, 170 to settle; the attenuators 150, 170 can, for example, be thermally-controlled optical attenuators. Settling is deemed to have occurred when the attenuators 150, 170 attain within 10% of their final fully-settled optical attenuation value; more preferably, the attenuators 150, 170 should have settled to within 2% of their final settled value for settling to be deemed to have occurred. If the token 300 is passed around the system 10 at a rate greater than the settling times of the attenuators 150, 170, it is necessary to pass the token 300 a plurality of times around the system 10 so that the system 10 iteratively adjusts itself.

It will be appreciated that modifications can be made to the system 10 without departing from the scope of the invention. The system 10 is provided as one example system embodying the invention. Other systems employing token-controlled regulation of system node settings are included within the scope of the invention. Moreover, the method of regulating radiation component power using token according to the invention can be used for controlling system parameters in addition to optical attenuation, for example:

(a) tuning wavelength of wavelength-shifting transponders;
(b) tuning of tunable ADM filters; and
(c) tuning of tunable modulated laser diodes used for injecting radiation components at the nodes 20 into the system 10.

The invention claimed is:

1. A method of regulating radiation component power in a wavelength division multiplexed (WDM) optical communications system having a plurality of nodes interconnected through waveguides, the nodes including power regulating means for regulating the power of WDM wavelength channels at a respective node, the method comprising the steps of:
   a) measuring the power of each WDM wavelength channel received at the respective node;
   b) recording the power of each of the WDM wavelength channels in at least one token;
   c) passing the at least one token around the system from one node to another node, the at least one token being configured to hold data indicative of the wavelength channel powers of multiple nodes of the system; and
   d) adjusting the power regulating means at each node in response to receiving the at least one token and in dependence on the WDM wavelength channel powers at one or more other nodes and the wavelength channel powers at the respective node in order to regulate the power of WDM wavelength channels at the respective node.

2. The method according to claim 1; and further comprising the step, for each node in possession of said at least one token, of adjusting attenuating means incorporated in the node for at least partially leveling the WDM radiation component powers within the system.

3. The method according to claim 1, in which the nodes are connected in a ring configuration; and further comprising the step of conveying said at least one token around the ring.

4. The method according to claim 3; and comprising the step of passing said at least one token alternately in a clockwise (CW) direction and a counter-clockwise (CCW) direction around the ring.

5. The method according to claim 3; and comprising the step of propagating said at least one token in a clockwise (CW) direction around the ring concurrently with propagating at least another token in a counter-clockwise (CCW) direction around the ring.

6. The method according to claim 1; and comprising the step of conveying said at least one token with general communication traffic.

7. The method according to claim 1; and comprising the step of conveying said at least one token around the system in a WDM supervisory channel.

8. The method according to claim 1; and comprising the step of designating one of the nodes to be a master node for initiating communication of said at least one token around the system after initial system energization.

9. The method according to claim 1, in which each node includes operating software for interpreting said at least one token; and the step of adjusting at least one of attenuation and tuning within the node for regulating the node.

10. The method according to claim 9; and further comprising the step, for each node in possession of said at least one token, of recording, in said at least one token, nodal settings corresponding to the node.

11. A wavelength division multiplexed (WDM) optical communication system for regulating radiation component power, comprising:
   a) a plurality of nodes interconnected through waveguides, the nodes including power regulating means for regulating the power of WDM wavelength channels at a respective node;
   b) means for measuring the power of each WDM wavelength channel received at the respective node;
   c) means for recording the power of each of the WDM wavelength channels in at least one token;
   d) means for passing the at least one token around the system from one node to another node, and the at least one token being configured to hold data indicative of the wavelength channel powers of multiple nodes of the system; and
   e) means for adjusting the power regulating means at each node in response to receiving the at least one token and in dependence on the WDM wavelength channel powers at one or more other nodes and the wavelength channel powers at the respective node in order to regulate the power of WDM wavelength channels at the respective node.

* * * * *